United States Patent
Simpson et al.

(10) Patent No.: US 8,137,058 B2
(45) Date of Patent: Mar. 20, 2012

(54) METHOD AND APPARATUS FOR DETERMINING CLEARANCE BETWEEN MOVING AND STATIC MEMBERS IN A MACHINE

(75) Inventors: Stanley Frank Simpson, Simpsonville, SC (US); George Martin Gilchrist, Greenville, SC (US); William Michael Genovese, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1045 days.

(21) Appl. No.: 12/045,223

(22) Filed: Mar. 10, 2008

(65) Prior Publication Data

US 2009/0226302 A1    Sep. 10, 2009

(51) Int. Cl.
*F01D 5/00* (2006.01)
*F01D 25/26* (2006.01)

(52) U.S. Cl. .................. 415/118; 415/119; 416/61
(58) Field of Classification Search .............. 415/118, 415/119; 416/61
See application file for complete search history.

(56) References Cited

U.S. PATENT DOCUMENTS

| | | | |
|---|---|---|---|
| 2,745,969 A * | 5/1956 | Keller | 250/360.1 |
| 4,704,906 A * | 11/1987 | Churchill et al. | 73/660 |
| 5,104,287 A | 4/1992 | Ciokajlo | |
| 5,280,549 A | 1/1994 | Barnard et al. | |
| 5,761,956 A * | 6/1998 | Beeson et al. | 73/660 |
| 6,054,866 A | 4/2000 | Mansfield | |
| 6,717,418 B2 | 4/2004 | Orenstein | |
| 7,033,135 B2 * | 4/2006 | Mortzheim et al. | 415/115 |
| 7,278,829 B2 | 10/2007 | Roedl et al. | |
| 7,891,938 B2 * | 2/2011 | Herron et al. | 415/1 |
| 2007/0043497 A1 | 2/2007 | Leogrande et al. | |
| 2010/0328141 A1 * | 12/2010 | Pfeifer et al. | 342/118 |

FOREIGN PATENT DOCUMENTS

WO   WO2006/005690   *   1/2006
WO   WO 2008009717       1/2008

* cited by examiner

*Primary Examiner* — Edward Look
*Assistant Examiner* — Liam McDowell
(74) *Attorney, Agent, or Firm* — Cantor Colburn LLP

(57) ABSTRACT

A machine includes a static member and a moving member. The moving member includes a central hub and a moving component. The moving component includes a first end portion fixedly connected to the central hub, a second end portion and an intermediate portion. The second end portion of the moving member is spaced from the static member so as to form a gap. A transmitting element is mounted to one of the static member and the moving member. The transmitting element emits an acoustic wave having a predetermined frequency across the gap. A receiving element is mounted to the other of the static member and the moving member. The receiving element receives the acoustic wave from the transmitting element. The machine further includes a controller that determines a clearance distance extending between the moving member and the static member based on the acoustic wave passing across the gap.

14 Claims, 3 Drawing Sheets

US 8,137,058 B2

METHOD AND APPARATUS FOR DETERMINING CLEARANCE BETWEEN MOVING AND STATIC MEMBERS IN A MACHINE

BACKGROUND OF THE INVENTION

The present invention pertains to the art of machines and, more particularly, to a method and apparatus for determining clearance between a moving member and a static member of a machine.

In the art of rotating machines, it is often necessary to measure clearance between moving or rotating and static components. Without proper clearance, the rotating component may contact the static component. Contacts and, in particular, high speed contacts can result in damage to one or the other of the rotating component and static component. In certain cases, measuring clearance is a minimally invasive procedure. However, in most cases, measuring clearance requires a certain level of machine disassembly or tear down. When the machine is in operation, clearances change due to heat, centrifugal forces and the like. Thus, static clearance must be set with a certain level of flexibility to allow for any changes that may occur. Heat, fatigue and other conditions serve to change operational clearance between moving and static components. In order to ensure that the machine is operating within tolerance, periodic maintenance is required to measure and adjust the clearance. Given the need, in most cases, for at least partial disassembly to measure clearance, maintenance requires that the machine be taken offline. Taking a machine offline is a time consuming and costly procedure that will have a negative impact on facility's production output.

In some cases, microwaves are employed to measure a running or moving clearance between turbine components. In such a case, a microwave transmitter is mounted to a moving component and a receiver is mounted to a static component in a turbine. A microwave is then passed between the receiver and transmitter to determine clearance. While effective in most cases, microwaves are affected by water. Given the interaction between microwaves and water, a microwave system for detection clearance would not be particularly effective in turbines in which the working fluid has a high moisture content, such as, for example, a steam turbine.

BRIEF DESCRIPTION OF THE INVENTION

The shortcomings of the prior art are overcome and additional advantages are provided through the provision of a machine constructed in accordance with exemplary embodiments of the present invention. The machine includes a static member and a moving member that is rotatably mounted relative to the static member. The moving member includes a central hub and at least one moving component. The at least one moving component includes a first end portion fixedly connected to the central hub, a second end portion and an intermediate portion. The second end portion of the moving member is spaced from the static member so as to form a gap. At least one transmitting element is mounted to one of the static member and the moving member. The at least one transmitting element emits an acoustic wave having a predetermined frequency across the gap. At least one receiving element is mounted to the other of the static member and the moving member. The at least one receiving element receives the acoustic wave from the transmitting element. The machine further includes a controller operatively connected to at least one of the at least one transmitting element and the at least one receiving element. The controller determines a clearance distance extending between the moving member and the static member based on the acoustic wave passing across the gap.

In accordance with another exemplary embodiment of the present invention, a method of determining clearance between a moving member and a static member of a machine includes generating an acoustic wave having a predetermined frequency from at least one transmitting element provided on one of the moving member and the static member of the machine, and directing the acoustic wave across a gap extending between the moving member and static member. The method further includes receiving the acoustic wave at least one receiving element mounted to the other of the moving member and the static member, and determining a clearance between the moving member and static member based on the acoustic wave signal passing across the gap.

Additional features and advantages are realized through the techniques of exemplary embodiments of the present invention. Other exemplary embodiments and aspects of the invention are described in detail herein and are considered a part of the claimed invention. For a better understanding of the invention with advantages and features thereof, refer to the description and to the drawings.

DETAILED DESCRIPTION OF THE INVENTION

Figure 1:
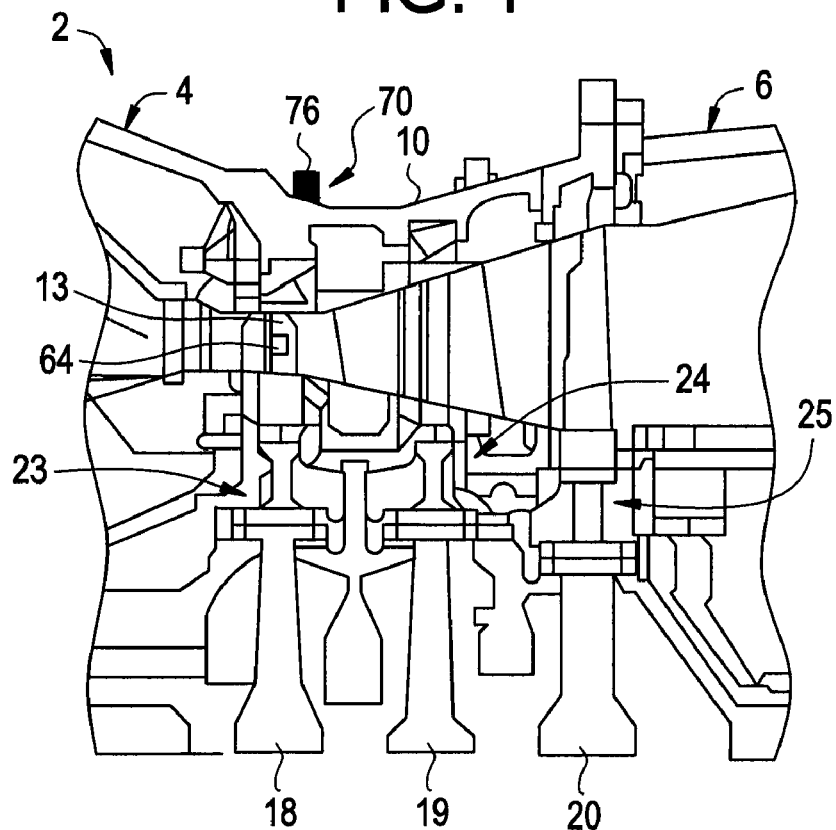
FIG. 1 is a partial cross-sectional view of a turbomachine including a system for determining a clearance between moving and static members in accordance with an exemplary embodiment of the present invention.

With initial reference to FIG. 1, a machine, shown in the form of a turbomachine, is generally indicated at 2. Turbomachine 2 includes a combustion portion 4 operatively connected to a turbine portion 6. Turbine portion 6 includes a static member or outer casing 10 having a shroud portion 13. Turbine portion 6 includes a plurality of stages 18-20 each having a corresponding moving member, shown in the form of a turbine fan assembly 23-25. As each turbine fan assembly is substantially similar, a detailed description will follow referencing turbine fan assembly 23, with an understanding that the remaining turbine fan assemblies 24-25 have corresponding structure.

Figure 2:
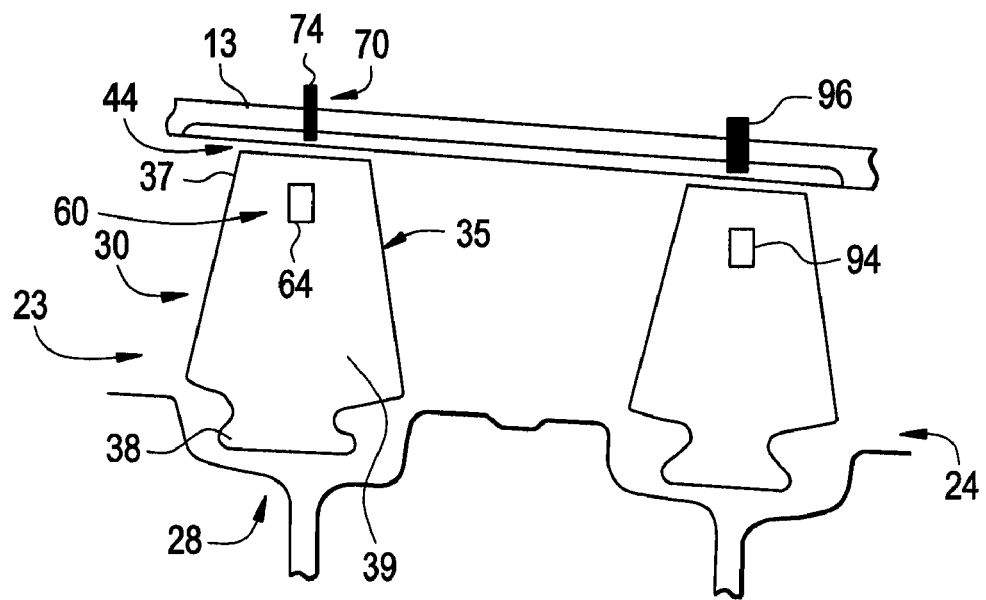
FIG. 2 is a detailed view of a portion of the turbomachine of FIG. 1 illustrating a transmitting element and a receiving element in accordance with another exemplary embodiment of the present invention.

Referring to FIG. 2, turbine fan assembly 23 includes a central hub 28 from which extend a plurality of moving components or turbine fan blades, one of which is indicated at 30. Turbine blade 30 includes a main body portion 35 having a first end or tip portion 37 that leads to a second end portion 38 through an intermediate portion 39. Second end portion 38 is connected to central hub 28 with tip portion 37 being spaced from shroud portion 13 so as to define a gap 44. Gap 44 defines a clearance between tip portion 37 and shroud portion 13. During operation, gap 44 changes as a result of thermal expansions of turbine blade 30 from heat passing though turbine 6. Over time, the heat and wear on turbine blade 30 will affect the gap. If the gap becomes too small, tip portion 37 can contact shroud portion 13 and cause damage to turbine blade 30. In order to enhance performance of turbomachine 2, gap 44 must be maintained within predetermined limits. Generally, gap 44 should be minimized in order to maximize efficiency. However, a trade off exists in maintaining a minimal gap and a risk of potential contacts between tip portion 37 and shroud portion 13. Towards that end, turbomachine 2 includes a system 50 (FIG. 3) for measuring, real time, the clearance between tip portion 37 and shroud portion 13, i.e., gap 44. As will be discussed more fully below, system 50 employs acoustic waves of a predetermined frequency to measure gap 44.

Figure 3:
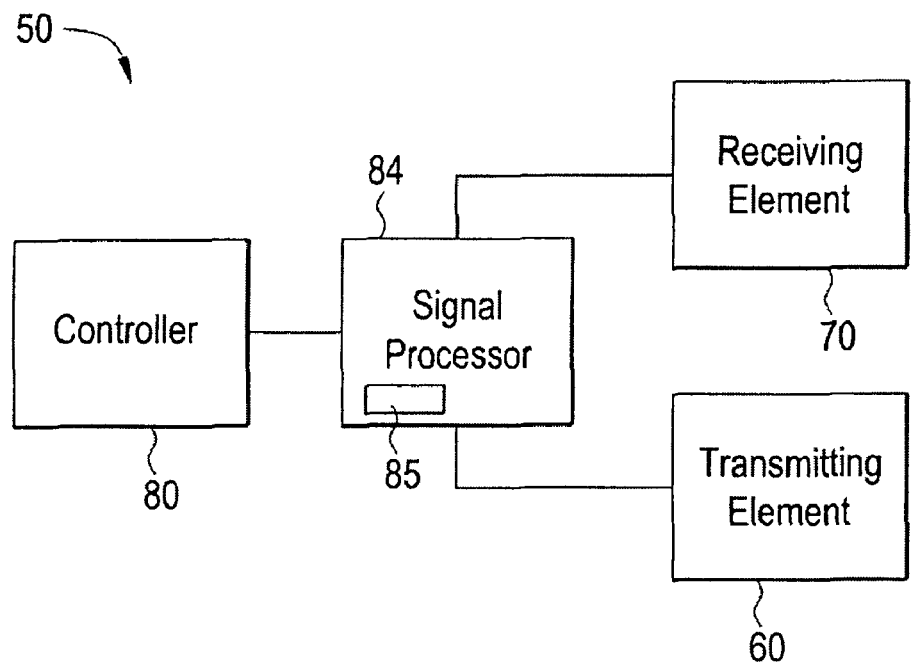
FIG. 3 is a schematic representation of the system for determining clearance between moving and static members in accordance with an exemplary embodiment of the present invention.

As best shown in FIGS. 2 and 3, system 50 includes a transmitting element 60 which, in the exemplary embodiment shown, is an active transmitting element or speaker 64 in the form of a piezoelectric chip mounted adjacent tip portion 37 of turbine blade 30. As will be discussed more fully below, speaker 64 emits an acoustic wave of a predetermined frequency. System 50 also includes a receiving element 70, which in the exemplary embodiment shown, takes the form of a microphone mounted to shroud portion 13. Receiving element 70 can also take the form of a microphone 76 mounted to casing 10. In either case, receiving element 70 and transmitting element 60 are operatively coupled to a signal processor 84 having a filter 85. Filter 85 can be an electronic filter or a software filter that is configured to isolate the predetermined frequency emitted by transmitting element 60. Filtered signals are passed to a controller 80, which determines a distance between transmitting element 60 and receiving element 70. After determining the distance between transmitting and receiving element 60 and 70, controller 80 calculates the size of gap 44.

In operation, turbine fan assemblies 23-25 rotate within shroud portion 13. Transmitting element 60 emits an acoustic signal that is received by receiving element 70. At this point the acoustic signal is filtered by signal processor 84 and passed to controller 80 for analysis. Controller 80 evaluates the acoustic signal to determine a size of gap 44. In addition to transmitting element 60 and receiving element 70, it should be understood that the remaining turbine fan assemblies 24-25 include corresponding transmitting and receiving elements such as shown at 94 and 96 in connection with turbine fan assembly 24. With this arrangement, each transmitting element, e.g. 64, 94 is configured to emit an acoustic wave having a distinct frequency that is isolated by controller 80 and correlated to a particular turbine fan assembly to calculate a corresponding gap.

Figure 4:
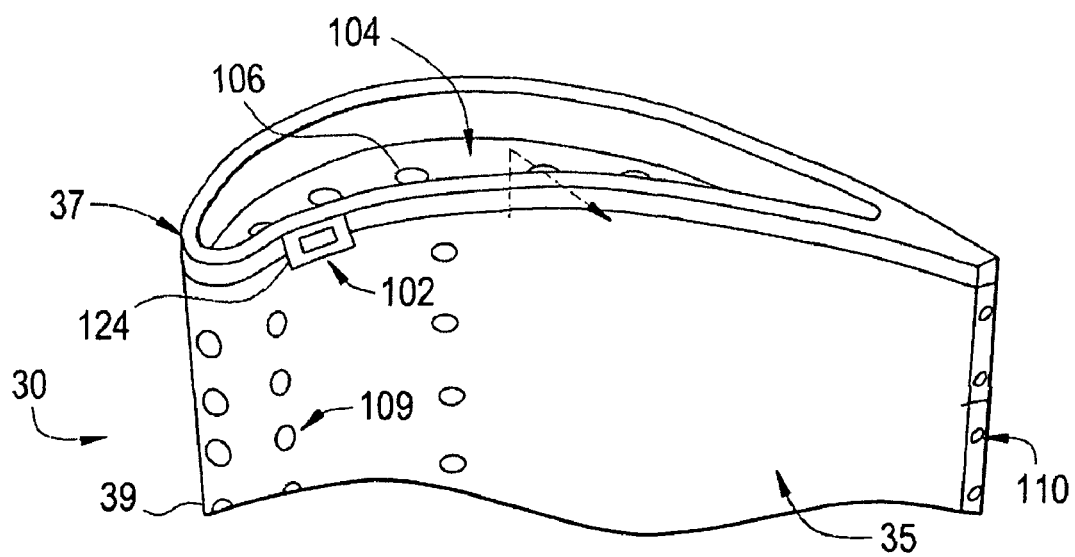
FIG. 4 is a partial perspective view of a tip portion of a rotating member having a passive transmitting element positioned in accordance with an exemplary embodiment of the present invention.

Reference will now be made to FIG. 4 in describing a transmitting element 102 constructed in accordance with another exemplary embodiment of the present invention. As shown, tip portion 37 of turbine blade 30 includes a recess or cavity 104 having a first plurality of openings 106. Openings 106 are configured to allow cooling air to pass out from turbine blade 30. Similarly, a second plurality of openings 109 extends longitudinally along main body portion 35 at a leading edge portion (not separately labeled) of turbine blade 30 and a third plurality of openings 110 extends longitudinally along main body portion 35 at a trailing edge portion (not separately labeled) of turbine blade 30. Openings 109 and 110 also provide a passage that allows cooling air to egress from turbine blade 30. In the embodiment shown, transmitting element 102 takes the form of a passive element or orifice 124 formed at tip portion 37. Orifice 124 is designed to create a sound wave (whistle) having a predetermined frequency when exposed to an air stream. More specifically, as turbine blade 30 is rotated within turbine portion 6, an air stream passes through orifice 124. The air stream generates an acoustic wave that is received by receiving element, for example 74. Receiving element 74 is tuned to "listen" for the acoustic wave emanating from orifice 124. With this construction, there is no need for an additional hard-wired connection from transmitting element 102 to controller 80. In addition to the above, controller 80 could be configured to detect contacts between turbine blade 30 and shroud portion 13. More specifically, if a rub occurs, transmitting element 102 will emit an acoustic wave having a frequency distinct from the predetermined frequency. If the different frequency is detected by receiving element 74, a contact is indicated.

Figure 5:
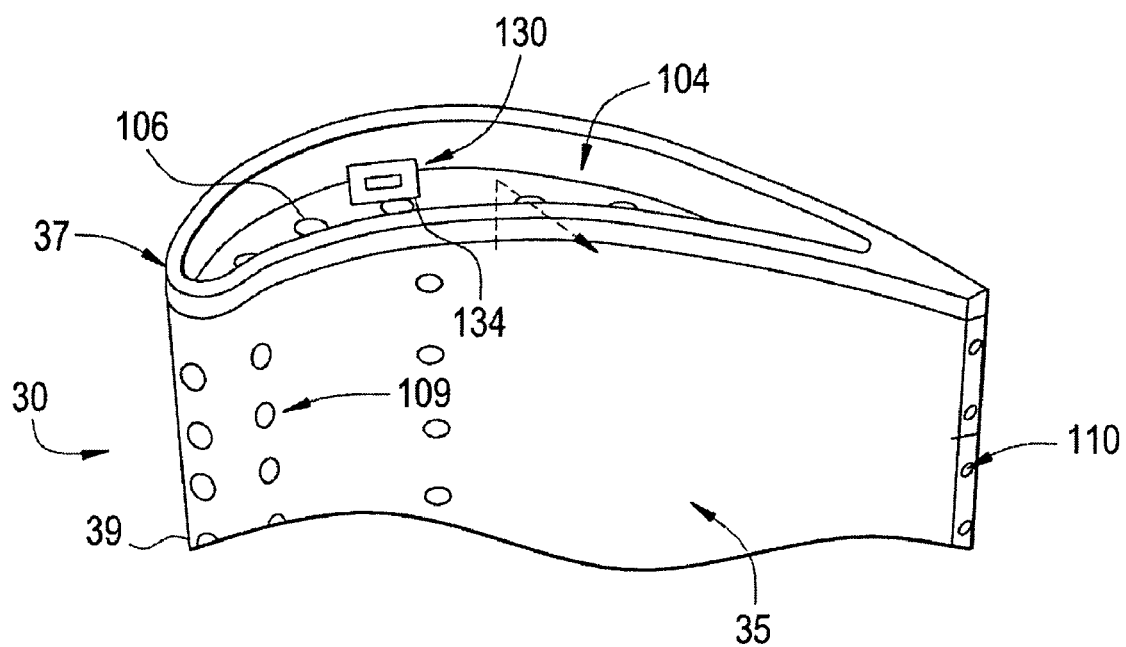
FIG. 5 is a partial perspective view of a tip portion of a rotating member having a passive transmitting element positioned in accordance with another exemplary embodiment of the present invention.

FIG. 5 illustrates a transmitting element 130 constructed in accordance with yet another exemplary embodiment of the present invention. Transmitting element 130 takes the form of an orifice formed within recess 104 at openings 106. With this arrangement, cooling air passing from turbine blade 30 through openings 106 also flows through orifice 134 to create the acoustic wave (whistle) having a predetermined frequency. With this construction, not only is additional hard-wiring between transmitting element 130 and controller 80 not necessary, by locating orifice 134 within recess 104, material properties of turbine blade 30 at tip portion 37 are not degraded. It should be appreciated that exemplary embodiments of the present invention provide for a low cost system for determining real time a size of a clearance between a moving body and a static body in a machine without requiring disassembly. The system enables personnel to monitor, real time, for any changes in the clearance and take corrective action before the moving member contacts the static member thereby increasing machine output by minimizing downtime. In addition, by monitoring the clearance real time, mean time between maintenance cycles is enhanced.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:

1. A gas turbomachine comprising:
  a static member fixedly mounted along a gas path of the gas turbomachine;
  a moving member rotatably mounted along the gas path of the gas turbomachine relative to the static member, the moving member including a central hub and at least one moving component, the at least one moving component including a first end portion fixedly connected to the central hub, a second end portion and an intermediate portion, the second end portion being spaced from the static member so as to form a gap;
  at least one passive transmitting element including an orifice provided at the second end portion of the at least one moving component, the at least one passive transmitting element emitting an acoustic wave having a predetermined frequency across the gap, wherein upon rotating the at least one moving component relative to the static member, an airflow passes through the orifice to create the acoustic wave;

at least one receiving element mounted to the static member the at least one receiving element receiving the acoustic wave from the passive transmitting element; and a controller operatively connected to at least one of the at least one passive transmitting element and the at least one receiving element, wherein the controller determines a clearance distance extending between the moving member and the static member based on the acoustic wave passing across the gap.

2. The gas turbomachine according to claim 1, wherein the at least one passive transmitting element is mounted to the moving member and the at least one receiving element is mounted to the static member.

3. The gas turbomachine according to claim 1, wherein the moving component is a turbine blade having a tip portion, the orifice being formed in the tip portion of the turbine blade.

4. The gas turbomachine according to claim 3, wherein the tip portion includes a recess having a cooling air outlet, the orifice being formed in the recess at the cooling air outlet, wherein cooing air passing from the turbine blade through the orifice establishes the acoustic wave.

5. The gas turbomachine according to claim 1, wherein the machine comprises a turbomachine including a compressor portion and a turbine portion.

6. The gas turbomachine according to claim 5, wherein the at least one moving component is a turbine blade.

7. The gas turbomachine according to claim 1, wherein the controller is operatively connected to a signal processor having one of an electronic filter and a software filter for refining a signal representing the acoustic wave received from the passive transmitting element.

8. A method of determining clearance between a moving member and a static member arranged along a gas path of a gas turbomachine, the method comprising:

generating an acoustic wave having a predetermined frequency wave by passing an airflow through an orifice provided on the moving member;

directing the acoustic wave across a gap extending between the moving member and static member;

receiving the acoustic wave at at least one receiving element mounted to the other of the moving member and the static member; and determining a clearance between the moving member and static member based on the acoustic wave signal passing across the gap.

9. The method of claim 8, further comprising: filtering the acoustic wave signal to isolate the predetermined frequency from background noise.

10. The method of claim 8, further comprising: actively transmitting the acoustic wave from the transmitting device.

11. The method of claim 8, further comprising: passing the airflow though the moving member and past the orifice to create the acoustic wave.

12. The method of claim 8, further comprising:

generating a plurality of acoustic waves, each of the plurality of acoustic waves being associated with a corresponding moving member;

passing each of the plurality of acoustic wave across a gap; and receiving each of the plurality of acoustic waves.

13. The method of claim 12, further comprising: differentiating between each of the plurality of acoustic waves.

14. The method of claim 13, further comprising: determining a clearance between each of the plurality of moving members and the static member.

* * * * *